Dec. 14, 1965   O. E. KLING ET AL   3,222,741
CABLE CLAMPS
Original Filed Jan. 13, 1961

INVENTORS
OLAF E. KLING
JOHN P. JORGENSON
BY

United States Patent Office 3,222,741
Patented Dec. 14, 1965

3,222,741
CABLE CLAMPS
Olaf E. Kling, Apt. 2C, 651 Busse Highway, Park Ridge,
Ill., and John P. Jorgenson, 3408 Robbins Road, Hillsboro Shores, Pompano Beach, Fla.
Continuation of application Ser. No. 82,641, Jan. 13, 1961. This application Oct. 21, 1964, Ser. No. 405,453
4 Claims. (Cl. 24—125)

This application is a continuation of Application Ser. No. 82,641, filed Jan. 13, 1961, now abandoned, for cable clamps. The invention thereof is directed to a cable clamp.

It is specifically useful with that type of cable in which a jacket of plastic material has been extruded over a stranded metal cable and the object of this invention is to provide a low-cost, efficacious cable clamp for cables of the type described. It is, however, equally efficacious with unjacketed stranded metal or fiber cables, although cables of such types have been largely superseded for marine and allied uses.

Referring now to the nomenclature of this application, we use the term "fetch" to designate the lengths of cable within what are called "cable confining regions." The "terminal fetch" is that length of cable confined within the "first cable confining region;" the "secondary fetch" is that length of cable confined within the "second cable confining region," and the "tertiary fetch" is that length of cable confined within the "third cable confining region." These three regions will be more particularly pointed out in the discussion of the appended drawings. "Bight" as it is used in this specification and the appended claims, is used in sense two, definition 2, 2nd ed. Webster's New International Dictionary, Unabridged, as follows: ". . . A loop, or double part, of a bent rope."

Figure 1:
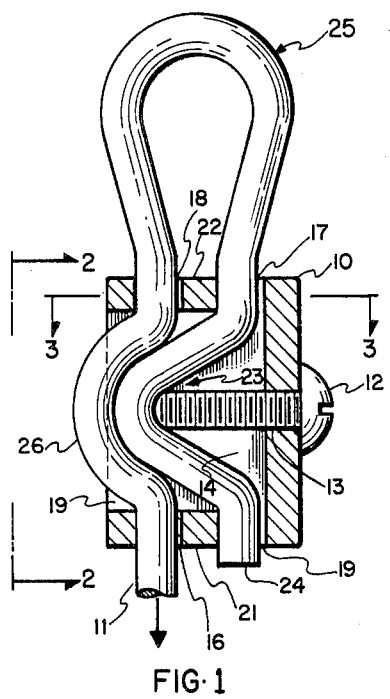
Figures 2, 3:
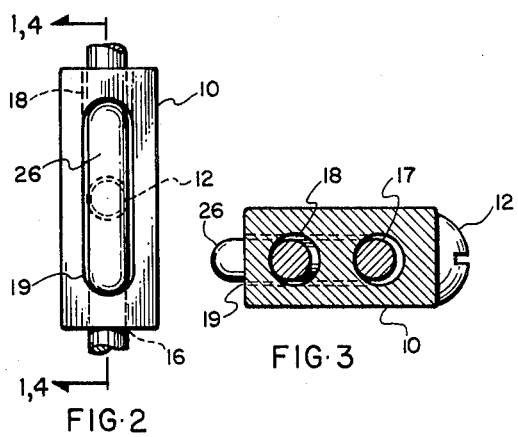
Figure 5:
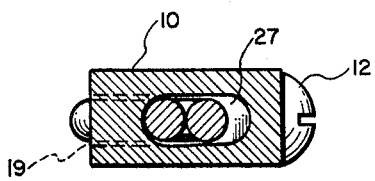
Figure 4:
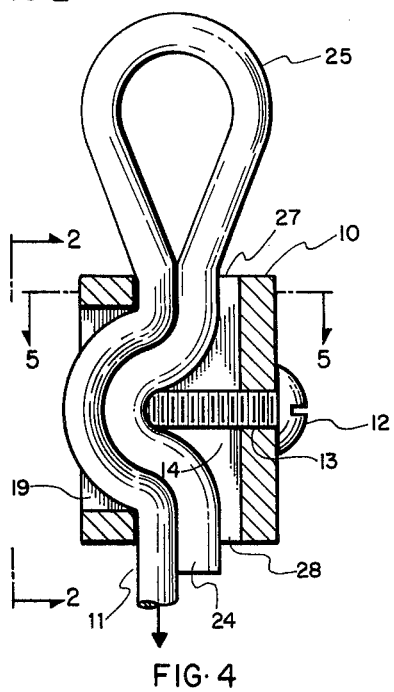

In the drawings, FIGS. 1 and 3 illustrate one type of our invention; FIGS. 4 and 5, another; FIG. 2 is common to both types.

FIG. 1 is a sectional view of a clamp body along the line 1, 4–1, 4, FIG. 2, showing a cable and cable confining means in elevation; FIG. 2 is a plan view of FIGS. 1, 4 from the direction 2—2, shown in those figures; FIG. 3 is a sectional view, along the line 3—3, FIG. 1; FIG. 4 discloses an alternative type of clamp, comprising a sectional view, similar to FIG. 1; FIG. 5 is a sectional view along the line 5—5 of FIG. 4.

Referring now particularly to FIGS. 1, 3, this form of clamp comprises a body member 10 in which a cable, indicated generally at 11 has been disposed. The element, designated "cable clamping means" in the claims, comprises the bolt 12 the shank of which is threaded and inserted through the tapped opening 13 in the body member 10. Within the body member 10 is an internal cavity 14 having a first opening 15, a second opening 16, and on the opposite sides of the cavity 14 a pair of openings 17, 18. Opposite the cable confining means 12 is an opening, indicated generally at 19. The second opening 16 has an axis defined by the arrow 20.

Between the openings 15, 16 is a first barrier 21, and between the pair of openings 17, 18 is a second barriar 22.

The bight of the terminal fetch of cable is indicated generally at 23, the terminal fetch being represented from the end of the cable 24 through the middle of the opening 17. The first cable confining region comprises the portion of the clamp containing the terminal fetch. The bight of the secondary fetch of cable is indicated generally at 25 and the second cable confining region comprises that portion of the clamp comprising the openings 17, 18. The bight of the tertiary fetch of cable is indicated generally at 26, and the third cable confining region comprises that portion of the clamp between the middle of the opening 18 and the opening 16.

A cable is clamped in accordance with FIG. 1 in the following manner; the cable is threaded through openings 16, 18, looped back through opening 17 and then threaded through opening 15, the cable confining means 12 being retracted during the operation. Within the loop of bight 25 of the secondary fetch a thimble, not shown, may be disposed, or the fetch may be threaded through an eye, not shown, or engage a hook, likewise not shown.

When a sufficient length of cable has been inserted to provide whatever length of loop 25 may be required for the application, and for the length of the bights 23, 26, the cable confining means 12 is then inserted within the cavity 14 to the extent that it reaches at least the axis indicated at the arrow 20 of the openings 16, 18, bringing the bights 23, 26 of cable to the positions shown in FIG. 1. While the shank of the cable confining means 12 may extend beyond this position, it is not necessary that it do so. When the cable is clamped, as shown, it will retain its clamped position without slippage against any normal loads for which the size of cable is designed.

It should be equally obvious that the device will clamp a cable without provision of the loop 25, in which event, the secondary fetch is drawn as tightly as the configuration of the cable permits between the openings 17, 18. Such a configuration is useful where the clamp is intended to serve as a stop at the end of the cable to prevent its running through a fair-lead, or the like.

Referring now to FIGS. 4–5, these reflect the preferred commercial embodiment of the invention and differ from FIG. 1 in the omission on the barriers 21, 22 and their replacement by the slots 25, 26. In other respects, the functioning of the two embodiments is the same, except that in the type of FIG. 4, insertion of the cable is effected by looping a section of the cable near the end 24 and thrusting it through the slots 25, 26 with the cable confining means 12 retracted, after which the procedures applicable to the embodiment of FIG. 1, and described above, are followed.

It will be seen from the foregoing description that we have provided a simple, low-cost means of clamping cables of the character described. Numerous variants of our invention will undoubtedly occur to those skilled in the art, and are to be construed within the scope of the claims hereto appended.

Having fully described our invention, we claim:
1. A cable clamp comprising
 a body member having
  a first cable confining region adapted to confine a terminal fetch of cable,
  a second cable confining region beyond said first cable confining region and so disposed that a bight of a secondary fetch of cable confined therein may be extended outwardly therefrom,
  a third cable confining region, adapted to confine a tertiary fetch of cable, and so disposed in respect of said first cable confining region that a tertiary fetch of cable confined therein may be brought into contact with a terminal fetch of cable confined in said first cable confining region, and
 confining means carried by said clamp body member adapted to bring the bights of terminal and tertiary fetches of cable confined therein into contact, and extendable to within said third cable confining region to displace said bights to the extent that, in a clamped position, the axis of the terminal fetch of cable at the center of the bight thereof is indexed with the axis of the third cable confining region,
 an opening in said body member, opposite said cable confining means, and opposed openings on either side of said first mentioned opening comprising end openings having a long and a short dimension, said first mentioned opening having a long and a short dimension, the short dimension being approximately equivalent to the short dimension of said opposed openings, and the long dimension thereof being substantially longer than the long dimension of said opposed openings.

2. A cable clamp in accordance with claim 1 in which the terminal and tertiary fetches of cable, when confined, are in contact throughout the length of said fetches.

3. A cable clamp in accordance with claim 1 in which the opposite ends of the secondary fetch of cable are in contact when confined.

4. A cable clamp, including
a clamp body of general parallelpiped configuration, having a top base with an opening adapted to receive extendable cable confining means, sides without openings to define an internal cavity, and ends with openings adapted to receive two lengths of cable juxtaposed, said end openings having a long and a short dimension, an opening opposite said top base having a long and a short dimension, the short dimension of the opening opposite said top base being approximately equal to the short dimension of the end openings, and the long dimension of said opening opposite said top base being substantially longer than the long dimension of the end openings, said cable confining means being extendable to a point within said internal cavity incident with the axis of a tertiary fetch of cable laid in said end openings.

References Cited by the Examiner
FOREIGN PATENTS

| | | |
|---|---|---|
| 19,259 | 9/1934 | Great Britain. |
| 570,307 | 7/1945 | Great Britain. |

WILLIAM FELDMAN, *Primary Examiner.*